(12) United States Patent
Joung

(10) Patent No.: US 6,748,017 B1
(45) Date of Patent: Jun. 8, 2004

(54) APPARATUS FOR SUPPLYING OPTIMAL DATA FOR HIERARCHICAL MOTION ESTIMATOR AND METHOD THEREOF

(75) Inventor: Ui-chel Joung, Anyang (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 630 days.

(21) Appl. No.: 09/637,993

(22) Filed: Aug. 15, 2000

(30) Foreign Application Priority Data

Aug. 27, 1999 (KR) ........................................ 1999-35841

(51) Int. Cl.⁷ .............................. H04N 7/12; G06K 9/36
(52) U.S. Cl. ................ 375/240.16; 382/236; 348/416.1
(58) Field of Search ....................... 375/240.16, 240.12, 375/240.24, 240.14; 348/699, 700, 402.1, 412.1, 416.1, 408.1; 382/232, 236; 345/620

(56) References Cited

U.S. PATENT DOCUMENTS

| | | | |
|---|---|---|---|
| 6,011,870 A | * 1/2000 | Jeng et al. | 382/236 |
| 6,014,181 A | * 1/2000 | Sun | 348/699 |
| 6,122,442 A | * 9/2000 | Purcell et al. | 345/620 |
| 6,130,912 A | * 10/2000 | Chang et al. | 375/240.16 |
| 6,418,166 B1 | * 7/2002 | Wu et al. | 375/240.12 |
| 6,556,716 B2 | * 4/2003 | Hong | 382/232 |

* cited by examiner

Primary Examiner—Gims Philippe
(74) Attorney, Agent, or Firm—Sughrue Mion, PLLC

(57) ABSTRACT

An apparatus for supplying optimal data for a hierarchical motion estimator, and a method thereof are provided. This method is performed by a data supplying apparatus including an SDRAM for storing current frame image data and previous frame image data, an SRAM for storing current macro block image data and previous macro block image data, and a motion estimator for generating a motion vector and a sum of absolute difference (SAD). In the data supplying method, data of a predetermined number of bits is supplied to the motion estimator. A predetermined number of data each having a predetermined bit length, including a motion vector and an SAD generated after the motion estimator processes data in units of macro blocks, are converted into data having a length of a certain number of bits formed through the SRAM. The converted data is stored in the SDRAM. Data stored in the SDRAM is read by a host in units of predetermined burst lengths. In the data supplying method, optimal data is supplied by storing only the size of an image block on an upper layer, instead of the entire frame image for the motion estimator, so that a minimum-sized memory can be realized.

7 Claims, 5 Drawing Sheets

APPARATUS FOR SUPPLYING OPTIMAL DATA FOR HIERARCHICAL MOTION ESTIMATOR AND METHOD THEREOF

BACKGROUND OF THE INVENTION

1. Field of the Invention

The present invention relates to a data supplying apparatus and method for motion estimation, and more particularly, to an apparatus and method for supplying optimal data for a hierarchical motion estimator.

2. Description of the Related Art

Generally, image communications systems, such as a moving picture storage device of digital televisions, moving picture teleconferencing, or image telephones, send and receive large amounts of multimedia information including real-time moving pictures. The multimedia information in the image communications systems has become increasingly complicated, but communications networks for transmitting the information have not followed the changing complexity of the multimedia information. In particular, moving pictures constitute the largest percentage of the multimedia information, and thus require a compression technique. The basic idea of the compression technique is removing spacial and temporal redundancy in a video sequence. Motion compensated predictive coding is representative of a method of removing redundancy from the multimedia information.

In the motion compensated predictive coding, the motion of images viewed from a time axis can be estimated by searching for the positions of matching blocks between a previous frame (t-1) and a current frame (t). Conventional full and hierarchical searches have been proposed to for estimating motion. The full search requires a large number of calculations, and a memory (for example, a static random access memory (SRAM) or synchronous dynamic random access memory (SDRAM)) for storing the macro blocks of a current image and macro blocks that correspond to a search region of a previous image. The hierarchical search also requires an image storing memory for the full search, even though the amount of calculation is significantly reduced. Thus, the hardware required for performing a conventional motion estimation algorithm includes a large image storing memory for only a motion estimator, thereby increasing the size of a chip.

SUMMARY OF THE INVENTION

To solve the above problem, it is an object of the present invention to provide an apparatus for storing only the size of an image block in an upper layer, instead of the entire frame, and supplying optimal data, for a motion estimator, and a method thereof.

To achieve the above objective, the present invention provides a data supplying apparatus including an arbiter for arbitrating the use of a memory, an SDRAM for storing the image data of current and previous frames, an SRAM for storing the macro block image data of the current and previous frames, and a motion estimator for generating a motion vector and a sum of absolute difference (SAD). In particular, the data supplying apparatus comprises an SDRAM address generator for reading the image data of the current and previous frames stored in the SDRAM, in units of macro blocks, and storing the read image data in the SRAM, and writing a motion vector and an SAD generated in units of macro blocks from the motion estimator from the SRAM to the SDRAM; an FIFO module unit for reading the frame image data from the SDRAM in units of bursts and storing the read data in the SRAM, and transmitting the motion vector and the SAD from the SRAM to the SDRAM in units of bursts; and an SRAM address generator for reading data among the macro block image data of the current and previous frames from the SRAM according to hierarchical search levels and writing the read image data to the internal registers of the motion estimator, and writing the motion vector and the SAD from the motion estimator to the SRAM.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
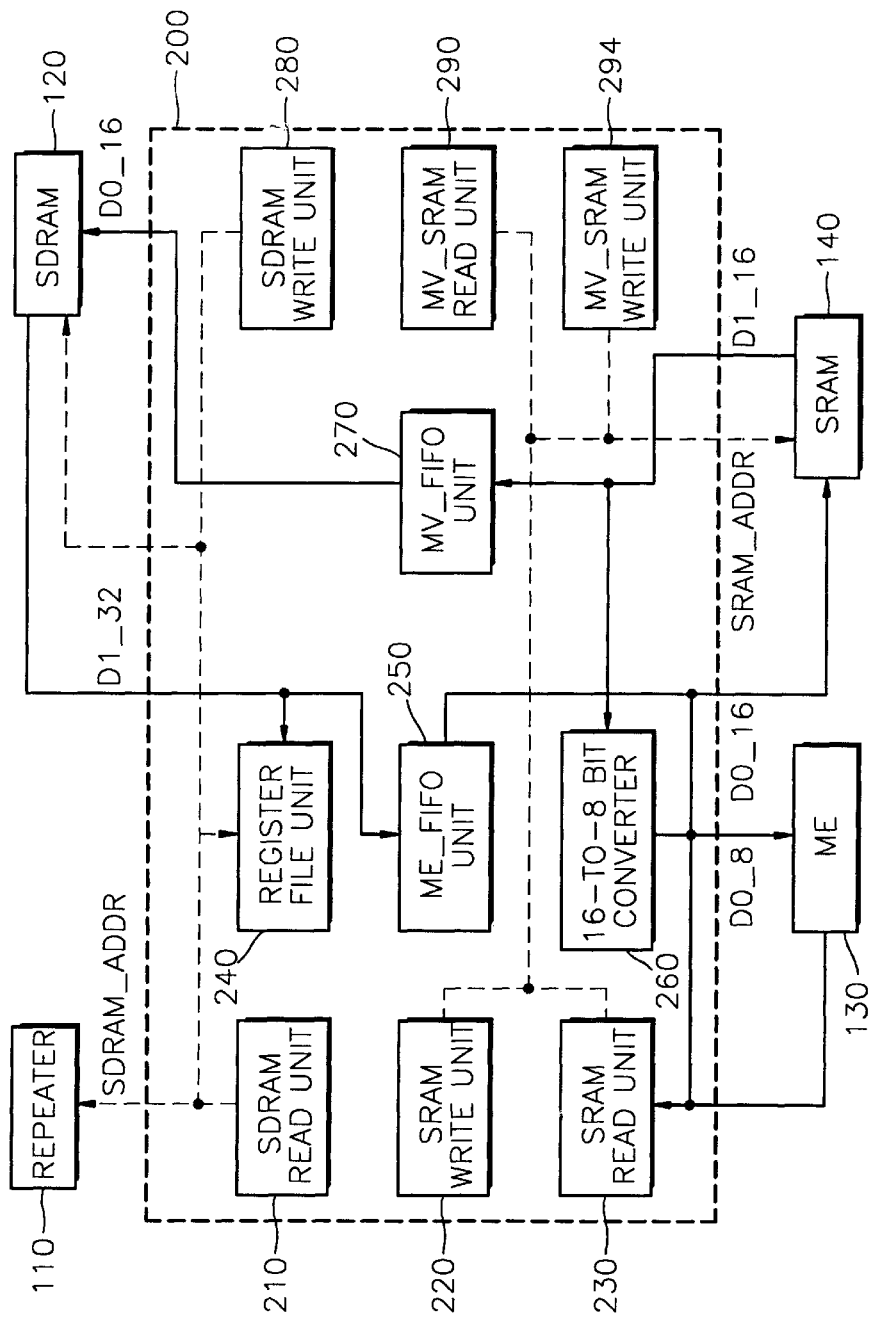
FIG. 1 is a block diagram of an optimal data supplying apparatus for a hierarchical motion estimator according to the present invention.

Referring to FIG. 1, a memory data supplying apparatus according to the present invention includes an arbiter 110, an SDRAM 120 for storing a current frame image and a previous frame image, an SRAM 140 for storing current macro block image data and previous macro block image data, a motion estimator (ME) 130 for generating a motion vector (MV) and a sum of absolute difference (SAD), and a data supply unit 200 installed between the arbiter 110, the SDRAM 120, the ME 130 and the SRAM 140, for transceiving data which is required for motion estimation. The data supply unit 200 is made up of a data setting module corresponding to a register file unit 240, an SDRAM address generation module having an SDRAM read unit 210 and an SDRAM write unit 280, a first-in-first-out (FIFO) module having an ME_FIFO unit 250 and an MV_FIFO unit 270, an SRAM address generation module having an SRAM write unit 220, an SRAM read unit 230, an MV_SRAM read unit 290 and an MV_SRAM write unit 294, and a bit conversion module corresponding to a 16-to-8 bit converter 260.

The data supply unit 200 supplies 8-bit data DO_8 for motion estimation to the motion estimator 130, converts a total of six 16-bit data including a motion vector, a final SAD and four intermediate SAD values which are generated by the ME 130, to three 32-bit data DO_32 so that a motion corrector (not shown) and a host read data with a burst length of three, and stores the 32-bit data in the SDRAM 120.

The data supply apparatus of FIG. 1 will now be described by modules with reference to FIGS. 2 through 9.

The register file unit 240, which is an initial data setting module, has initial address offset values and commands which are required to supply data for motion estimation, the commands and offset values being set by a host. In the register file unit 240, a desired start offset value or command is enabled or disabled by data which is received via a 32-bit data bus DO_32 from the SDRAM 120, and data which is received from the arbiter 110.

The SDRAM address generation module (210 and 280) fundamentally generates a read/write address of the SDRAM 120 in consideration of a burst length, a CIF/QCIF and a data width, and outputs the read/write address to the arbiter 110 in synchronization with a data request signal DATA_REQ, burst length data BURST_LENGTH and a read/write signal NRW which are output by a control module (not shown). Further, the SDRAM address generation module (210 and 280) reads the current frame image data and the previous frame image data, which are stored in the SDRAM 120, in units of macro blocks. Here, the data width of the SDRAM 120 is 32 bits, the data width of the SRAM 140 is 16 bits, and a pixel data width, which is processed by the motion estimator 130, is 8 bits. Accordingly, the SDRAM address generation module (210 and 280) actually requires only 32-bit data, which is as large as one quarter of the total number of macro pixels, in order to read 16×16 pixel data from the SDRAM 120.

The SDRAM address generation module (210 and 280) is actually satisfied with only a 16-bit address when 32-bit data is read with a burst length of four. The SDRAM address generation module (210 and 280) reads current 16×16 macro data and then reads 48×48 previous image data among an image frame stored in the SDRAM 120. This operation is continuously performed a number of times which is equal to the number of operation units. When an operation on one image frame is completed, a new current/previous address start offset is received from a host, and then an operation on a new frame starts.

Figure 2:
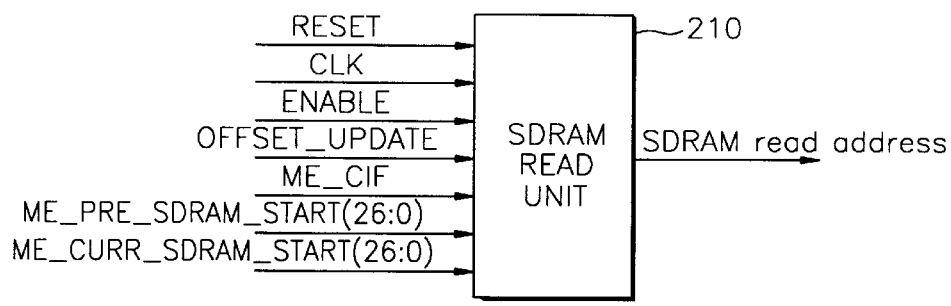
FIG. 2 is a detailed diagram of the SDRAM read unit 210 of FIG. 1.

Referring to FIG. 2, the SDRAM read unit 210 receives a reset signal RESET, a clock signal CLK, an enable signal ENABLE, an offset-update signal OFFSET_UPDATE, a format classification signal ME_CIF, a first address start offset value ME_PRE_SDRAM_START, and a second address start offset value ME_CURR_SDRAM_START, and generates an SDRAM read address. Also, the SDRAM read unit 210 consecutively reads current frame data and previous frame data which are stored in the SDRAM 140, a number of times equal to the number of operation units in units of macro blocks.

More specifically, the SDRAM read unit receives the previous/current address start offset values ME_PRE_SDRM_START and ME_CURR_SDRAM_START for setting an initial address, and the format classification signal ME_CIF for classifying CIF/QCIF. In order to prevent an address offset value from being set in a register after being reset, an offset-update signal OFFSET_UPDATE for loading an address start offset value ME_PRE_SDRM_START or ME_CURR_SDRAM_START is received before an enable signal ENABLE is received. As shown in the timing diagram of FIG. 3, the address SDRAM_ADDR and the data DATA_32 of the SDRAM 120 are applied to the arbiter 110 in consideration of the timing of several different signals (i.e., a clock signal CLK, a read/write control signal NRW, a data request signal DATA_REQ, burst length data BURST_LENGTH, an acknowledgment signal ACK, and a data transmission signal DATA_IN_TRANS).

Figure 4:
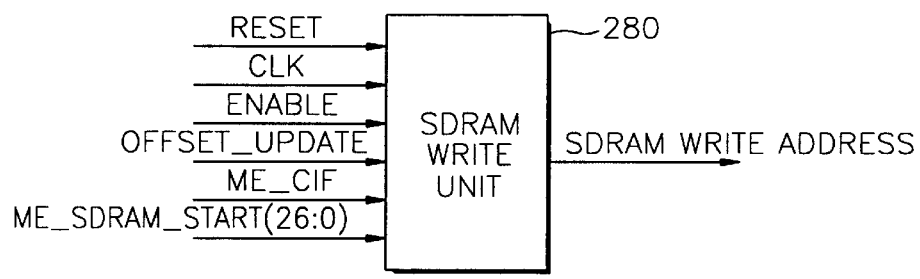
FIG. 4 is a detailed diagram of the SDRAM write unit 280 of FIG. 1.

Referring to FIG. 4, the SDRAM write unit 280 receives a reset signal RESET, a clock signal CLK, an enable signal ENABLE, a motion vector offset-update signal MV_OFFSET_UPDATE, a format classification signal ME_CIF, and an address start offset value ME_SDRAM_START, and generates an SDRAM write address. In particular, the SDRAM write unit 280 generates an SDRAM write address SDRAM WRITE_ADDR for storing a motion vector MV and SADs, produced with respect to one macro block by the ME 130, from the SRAM 140, in the SDRAM 120. Here, the SDRAM write unit 280 receives the address start offset ME_SDRAM_START which is an initial address for storing the motion vector MV and the SADs, and the format classification signal ME_CIF for classifying CIF/QCIF. In order to prevent an address offset value from being set in a register after being reset, an offset-update signal OFFSET_UPDATE for loading an address start offset ME_SDRAM_START to the SDRAM read unit 210 is received before an enable signal ENABLE is received.

Figure 5:
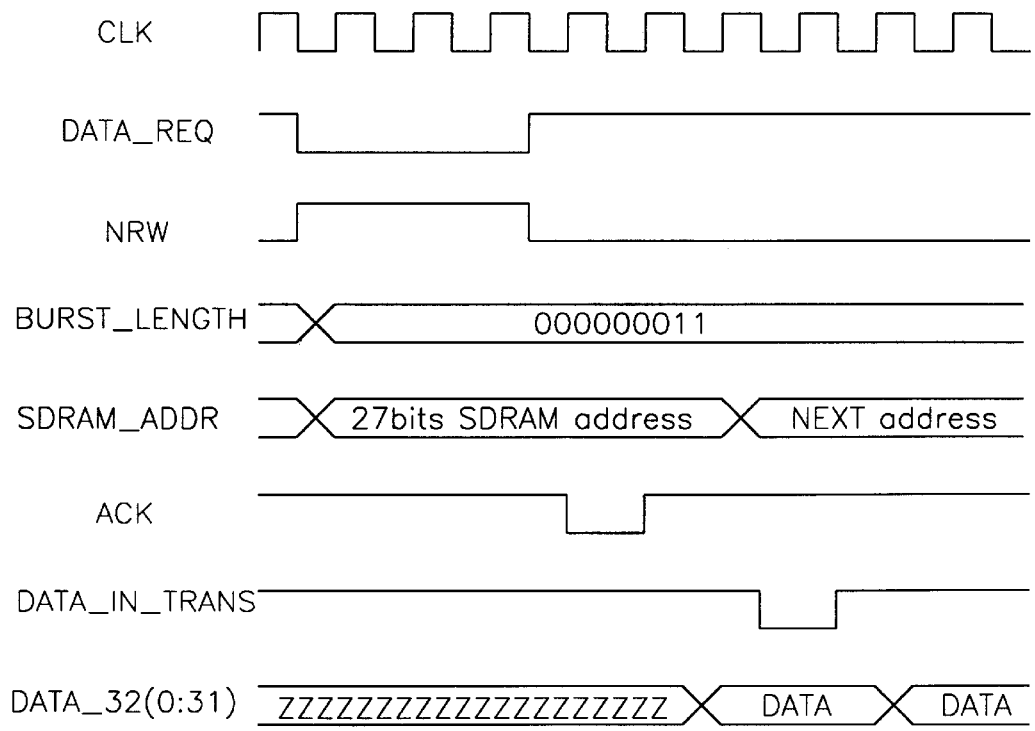
FIG. 5 is a timing diagram of the SDRAM write unit 280 of FIG. 4.

As shown in the timing diagram of FIG. 5, the address SDRAM_ADDR in the SDRAM 120, and the data DATA_32 actually intended to be stored, are applied to the arbiter 110 in consideration of the timing of several different signals (i.e., a clock signal CLK, a read/write control signal NRW, a data request signal DATA_REQ, burst length data BURST_LENGTH, an acknowledgment signal ACK, and a data transmission signal DATA_IN_TRANS).

Figure 3:
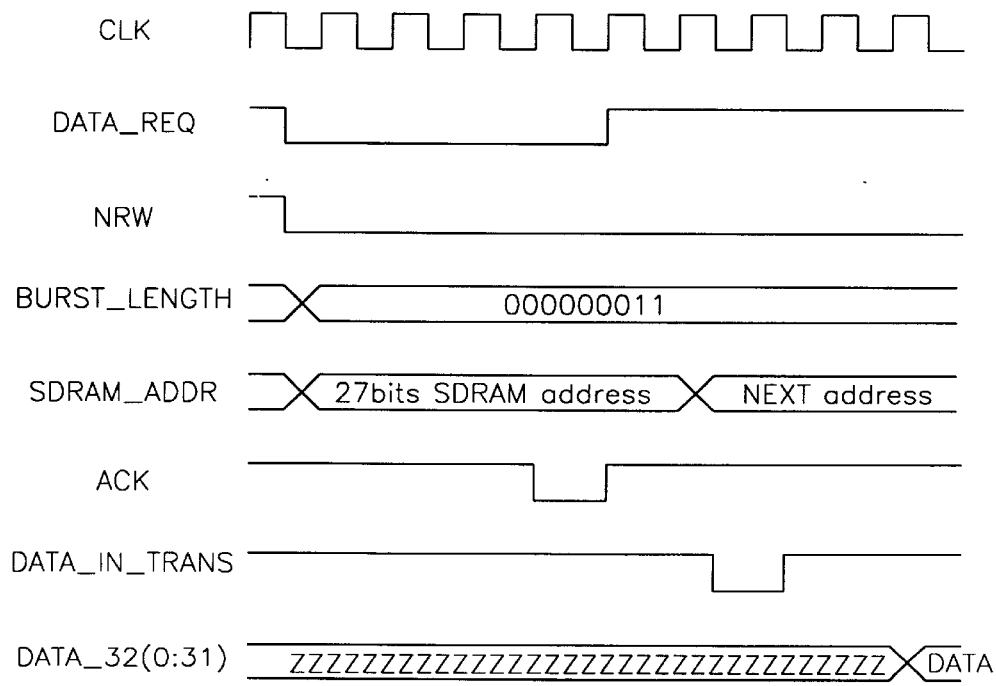
FIG. 3 is a timing diagram of the SDRAM read unit 210 of FIG. 2.
Figure 6:
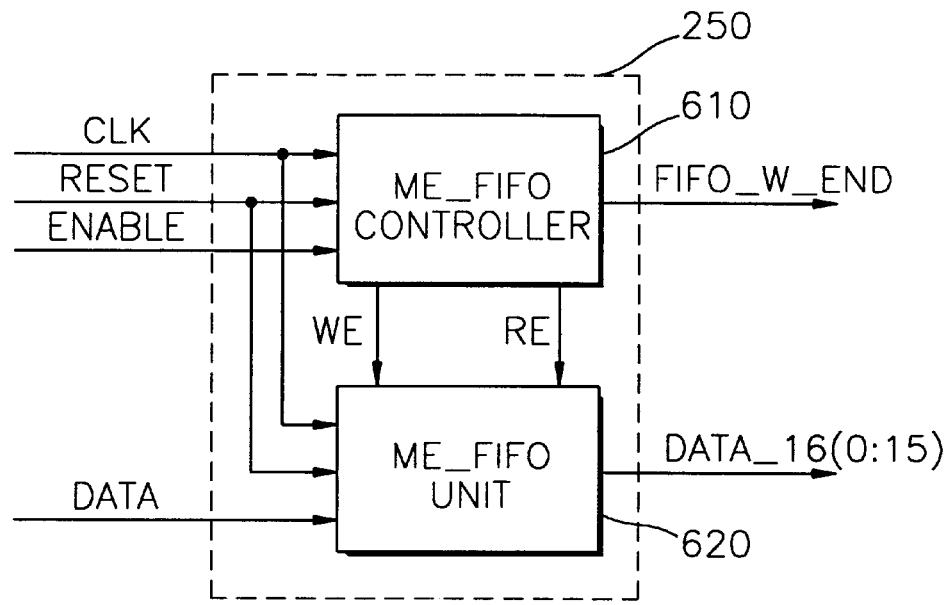
FIG. 6 is a detailed diagram of the ME_FIFO unit 250 of FIG. 1.
Figure 7:
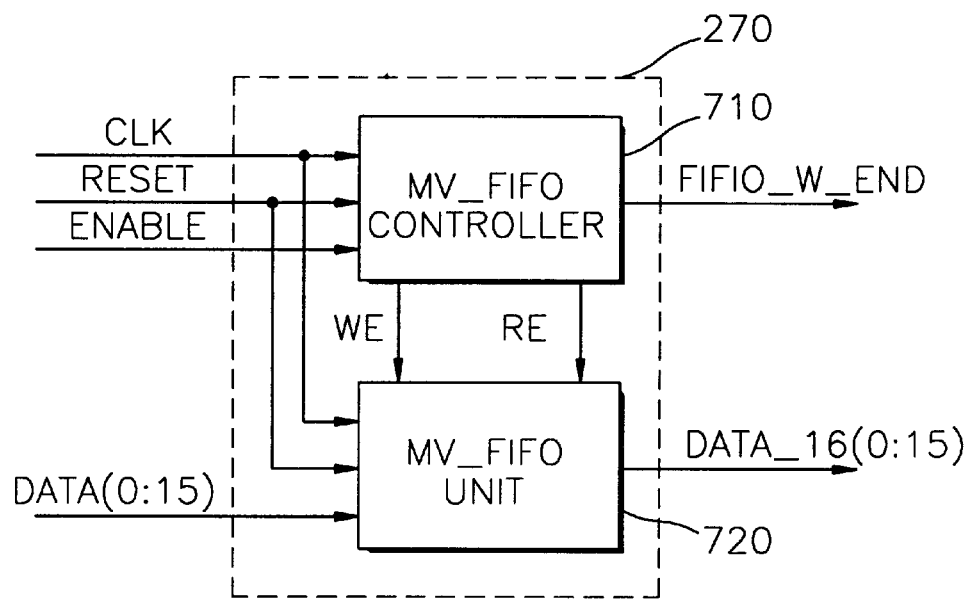
FIG. 7 is a detailed diagram of the MV_FIFO unit 270 of FIG. 1.

Referring to FIGS. 6 and 7, the FIFO module comprising the ME_FIFO unit 250 and the MV_FIFO unit 270 transmits a motion vector and an SAD from the SRAM 140 to the SDRAM 120 in units of bursts. A delay of approximately seven clocks exists until actual data is received after the FIFO module demands data together with an address from the SDRAM 120. Here, it is a large loss of bandwidth for the FIFO module to read the data of one address each time. Thus, in order to solve this problem, the FIFO module reads data from the SDRAM 120 in units of bursts to improve the total speed of a system. Accordingly, the FIFO module requires a capacity that is as large as the length of a burst to read and store 32-bit image data, since the data width of the SRAM 140 is 16 and the data width of the SDRAM 120 is 32. For example, if a burst length is four, an FIFO having a data width of 32 and a data depth of four is used, and if a burst length is three, an FIFO having a data width of 32 and a depth of three is used. The data DATA_32 applied to the FIFO module requires close timing with the data transmission signal DATA_IN_TRANS and the acknowledgment signal ACK received from the arbiter 110, as shown in FIGS. 3 and 5. A burst length of four is used to read 32-bit image data from the SDRAM 120, so that the FIFO module fundamentally has a data width of 32 and a depth of four.

Referring to FIG. 6, the ME_FIFO unit 250 is made up of an ME_FIFO controller 610 for generating a read/write signal, and an ME_FIFO unit 620 for performing an actual FIFO operation. The ME_FIFO controller 610 generates a write enable signal WE and a read enable signal RE for four and eight clocks, respectively, when an enable signal ENABLE is received, and outputs a write end signal FIFO_W_END to accomplish a state transition in a finite state machine (FSM). The ME_FIFO unit 620 consecutively reads four 32-bit image data from the SDRAM 120 in response to the write enable signal WE generated for four clocks, with a burst length of four, and stores the read data in its internal register, and outputs 16 bit data DATA_16 to the SRAM 140 in response to the read enable signal RE generated for 8 clocks. Here, the ME_FIFO unit 620 requires a duration of 2 clocks to convert 32-bit data into 16-bit data.

Referring to FIG. 7, the MV_FIFO unit 270 comprises an MV_FIFO controller 710 for generating a write enable signal WE and a read enable signal RE, and an MV_FIFO unit 720 for performing an actual FIFO operation.

The MV_FIFO controller 710 generates the write enable signal WE and the read enable signal RE for 4 clocks and 8 clocks, respectively, when an enable signal ENABLE is received, and outputs a write end signal FIFO_W_END to accomplish state transition in the FSM. The MV_FIFO unit 720 essentially reads six 16-bit data, that is, a motion vector (Mvx,Mvy), a final SAD, and four intermediate SAD, from the SRAM 140 in succession for 6 clocks, and stores the read data in its internal register, and then converts the 16-bit data into 32-bit data for three clocks and outputs data DATA_16 to be written to the SDRAM 120 together with the acknowledgment signal ACK and the data transmission signal DATA_IN_TRANS, which are received from the arbiter 110, with a burst length of three. Here, the MV_FIFO unit 720 requires a duration of one clock to convert 16-bit data into 32-bit data.

Figure 8:
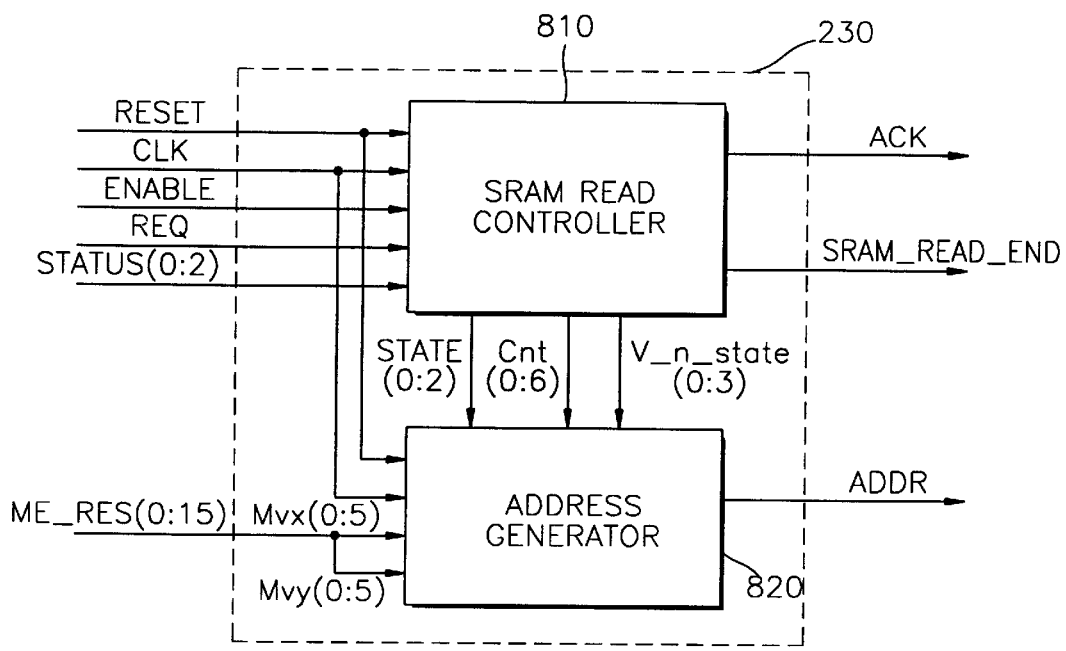
FIG. 8 is a detailed diagram of the SDRAM read unit 230 of FIG. 1.
Figure 9:
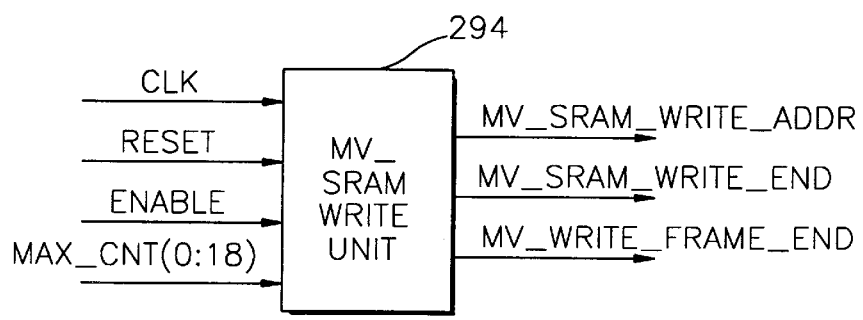
FIG. 9 is a detailed diagram of the MV_SRAM write unit 294 of FIG.

Referring to FIGS. 8 and 9, the SRAM address generation module (220, 230, 290 and 294) generates a 12-bit SRAM address for reading data from and writing data to an asynchronous SRAM. The SRAM write unit 220 writes image data from the SDRAM 120 to the SRAM 140, simply increments a counter (not shown), and increases an address by one from 0 to 1279 for each clock when the SRAM write unit is enabled. Here, addresses 0 through 255 are for current image data, and addresses 256 through 1279 are for previous image data. The SRAM read unit 230 supplies the image data stored in the SRAM 140 to the ME 130, and supplies desired data among the current and previous macro image data stored in the SRAM 140 to the ME 130 at any time required, and stores the same in the internal registers of the ME 130.

Referring to FIG. 8, the SRAM read unit 230 comprises an SRAM read controller 810 for outputting state control signals STATE, CNT and V_N_STATE, an SRAM read end signal SDRAM_READ_END, and an acknowledgment signal ACK in response to a reset signal RESET, a clock signal CLK, an enable signal ENABLE, a request signal REQ and a status signal STATUS, and an address generator 820 for actually generating an address ADDR in response to the reset signal RESET, the clock signal CLK and vector values MVx and MVy.

The address generator 820 generates a different address according to an upper level, an intermediate level and a lower level of a hierarchical search. That is, in the case of upper level data, a least significant bit (LSB) is removed from an address ADDR, and 16-bit data in every other address (e.g., addresses 0, 2, 4, 6, . . . ) is read. Finally, 8-bit data is output every four addresses. In the case of intermediate level data, an address ADDR is increased by 1 for each clock, and the LSB is removed from each address, thereby ½ sub-sampling data. In the case of lower level data, an address ADDR increases by 1 per two clocks, an LSB is removed from each address, and data are sequentially read one data item for each clock.

Referring to FIG. 9, the MV_SRAM write unit 294 outputs a write address MV_SRAM_WRITE_ADDR in response to a reset signal RESET, a clock signal CLK, an enable signal ENABLE, and a maximum counter value MAX_CNT, and also outputs an MV SRAM write end signal MV_SRAM_WRITE_END and an MV write frame end signal MV_WRITE_FRAME_END which represent state transition.

The MV_SRAM write unit 294 writes a final MV and SAD from the ME 130 to the SRAM 140 by increasing a maximum counter value MAX_CNT and increasing a write address MV_SRAM_WRITE_ADDR by 1, from 1280, for each clock, when the MV_SRAM write unit is enabled. Here, the write addresses MV_SRAM_WRITE_ADDR 1280 or greater are utilized since addresses 0 through 1279 have already been designated for image data. The value of the last address is greatly related to an operation unit. For example, if the operation unit is 3, the motion vectors of 3 macro blocks, final SADs of three macro blocks, and intermediate SADs of 12 macro blocks must be stored in the SRAM 140 through three times in basic units of 3 macro blocks. Accordingly, a final address value is 1298 (=1280+ 18). Here, the operation unit must always be a multiple of 3.

According to the present invention as described above, the use of a general dedicated memory for estimating a motion that is as large as the entire size of a frame is excluded by storing only the size of an image block on an upper layer, instead of the entire frame image, for a motion estimator. Further, memories having a small capacity can be utilized so that a chip size can be minimized.

What is claimed is:

1. A data supplying apparatus comprising:

a dynamic storage unit and a static storage unit each for storing image data;

a motion estimator for generating motion vector data and sum of absolute difference (SAD) data based on image data stored in the dynamic storage unit and the static storage unit; and a data supply unit for supplying data required by the motion estimator, the data supply unit comprising:

a first address generator for reading in units of macro blocks the image data stored in the dynamic storage unit, storing the image data read from the dynamic storage unit in the static storage unit, and writing the motion vector data and the SAD data generated in units of macro blocks by the motion estimator from the static storage unit to the dynamic storage unit;

a first-in-first-out (FIFO) module unit for storing the image data of the dynamic storage unit, which is read by the first address generator, in the static storage unit in units of bursts, and transmitting the motion vector data and the SAD data from the static storage unit to the dynamic storage unit in units of bursts; and a second address generator for reading the image data in units of macro blocks stored in the static storage unit through the FIFO unit according to a plurality of levels of a hierarchical motion estimation search and writing the image data read from the static storage unit to the internal registers of the motion estimator, and writing the motion vector data and the SAD data from the motion estimator to the static storage unit.

2. The data supplying apparatus of claim 1, wherein the first address generator comprises:

a read unit for consecutively reading current frame data and previous frame data which are stored in the dynamic storage unit, a predetermined number of times which is equal to a number of operation units, in units of macro blocks; and a write unit for writing the motion vector data and the SAD data generated in units of macro blocks by the motion estimator, from the static storage unit to the dynamic storage unit.

3. The data supplying apparatus of claim 1, wherein the FIFO module unit comprises:

a motion estimation FIFO unit for consecutively reading the image data from the dynamic storage unit for a predetermined number of clocks with a predetermined burst length and storing the read image data in an internal register of the motion estimation FIFO unit, and converting the bit unit of the image data into a predetermined bit unit for a predetermined number of clocks and outputting the converted bit data to the static storage unit; and a motion vector FIFO unit for consecutively reading the motion vector data and the SAD data from the static storage unit for a predetermined number of clocks and storing the read motion vector and SAD data in an register of the motion vector FIFO unit, and then storing the read motion vector and SAD data in the dynamic storage unit in units of bursts for a predetermined number of clocks.

4. The data supplying apparatus of claim 1, wherein the second address generator comprises:

a read unit for reading current frame data and previous frame data stored in the static storage unit when required by the motion estimator according to upper, intermediate and lower levels of the hierarchical motion estimation search, and storing the read current and previous frame data in internal registers of the motion estimator; and a write unit for writing final motion vector data and final SAD data from the motion estimator to the static storage unit according to an operation unit.

5. The data supplying apparatus of claim 4, wherein the read unit generates addresses for the upper level of the hierarchical motion estimation search by removing a least significant bit from an address and reading data from every other address, generates addresses which are sub-sampled for the intermediate level of the hierarchical motion estimation search by removing a least significant bit from each address after increasing the value of an address by 1 for each clock, and generates addresses for the lower level of the hierarchical motion estimation search sequentially reading data for each clock after increasing the value of an address by one per two clocks and removing a least significant bit from each address.

6. The data supplying apparatus of any of claims 1 through 5, wherein the dynamic storage unit is a synchronous dynamic random access memory (SDRAM) and the static storage unit is a static random access memory (SRAM).

7. A data supplying method for a data supplying apparatus comprising a dynamic storage unit for storing current frame image data and previous frame image data, a static storage unit for storing current macro block image data and previous macro block image data, and a motion estimator for generating motion vector data and sum of absolute difference (SAD) data, the method comprising:

supplying a predetermined number of bits of image data to the motion estimator;

converting a predetermined number of data groups of a first predetermined bit length, including motion vector data and SAD data generated after the motion estimator processes data in units of macro blocks, into a second predetermined number of data groups of a second predetermined bit length, and storing the converted data in the dynamic storage unit; and reading data stored in the dynamic storage unit in units of predetermined burst lengths by a host.

\* \* \* \* \*